(12) United States Patent
Krey et al.

(10) Patent No.: US 12,351,309 B2
(45) Date of Patent: Jul. 8, 2025

(54) WING FOR AN AIRCRAFT

(71) Applicant: Airbus Operations GmbH, Hamburg (DE)

(72) Inventors: Dennis Krey, Hamburg (DE); Steffen Kleemiß, Hamburg (DE); Christian Jürdens, Hamburg (DE); Alexander Huber, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/406,989

(22) Filed: Jan. 8, 2024

(65) Prior Publication Data
US 2024/0239473 A1    Jul. 18, 2024

(30) Foreign Application Priority Data
Jan. 16, 2023  (EP) ..................................... 23151780

(51) Int. Cl.
*B64C 9/02*    (2006.01)
*B64C 7/00*    (2006.01)

(52) U.S. Cl.
CPC . *B64C 9/02* (2013.01); *B64C 7/00* (2013.01)

(58) Field of Classification Search
CPC .... B64C 9/02; B64C 7/00; B64C 9/22; B64C 3/185
See application file for complete search history.

(56) References Cited

U.S. PATENT DOCUMENTS

| | | | | |
|---|---|---|---|---|
| 5,222,653 A * | 6/1993 | Joyce | ........................ | B64C 9/22 228/173.6 |
| 2010/0258674 A1 | 10/2010 | Sutton et al. | | |
| 2011/0168849 A1* | 7/2011 | Parker | ...................... | B64C 9/22 244/214 |
| 2012/0012712 A1* | 1/2012 | Eden | ......................... | B64C 9/22 244/123.1 |
| 2015/0298795 A1* | 10/2015 | Parker | ...................... | B64C 9/02 244/214 |
| 2018/0135735 A1 | 5/2018 | Brakes | | |

FOREIGN PATENT DOCUMENTS

WO        2010/122324 A2    10/2010

OTHER PUBLICATIONS

Extended European Search Report for EP23151780.6, mailed Jun. 16, 2023, 8 pages.

\* cited by examiner

*Primary Examiner* — Rodney A Bonnette
(74) *Attorney, Agent, or Firm* — Nixon & Vanderhye P.C.

(57) ABSTRACT

A wing 3 including a main wing 5, a slat 7, and a connection assembly 9 movably connecting the slat 7 to the main wing 5, wherein the slat 7 moves between a retracted position and an extended position, wherein the front spar 37 includes an aperture 41 for a slat track 17 and the main wing 5 comprises a track housing assembly 43 including a track housing 45 and a mounting device 47, wherein the track housing 45 is mounted to the front spar 37 at the aperture 41 by the mounting device 47 and extending from the front spar 37 to the interior 42 of the wing box 35, the track housing 45 receives the slat track 17.

18 Claims, 3 Drawing Sheets

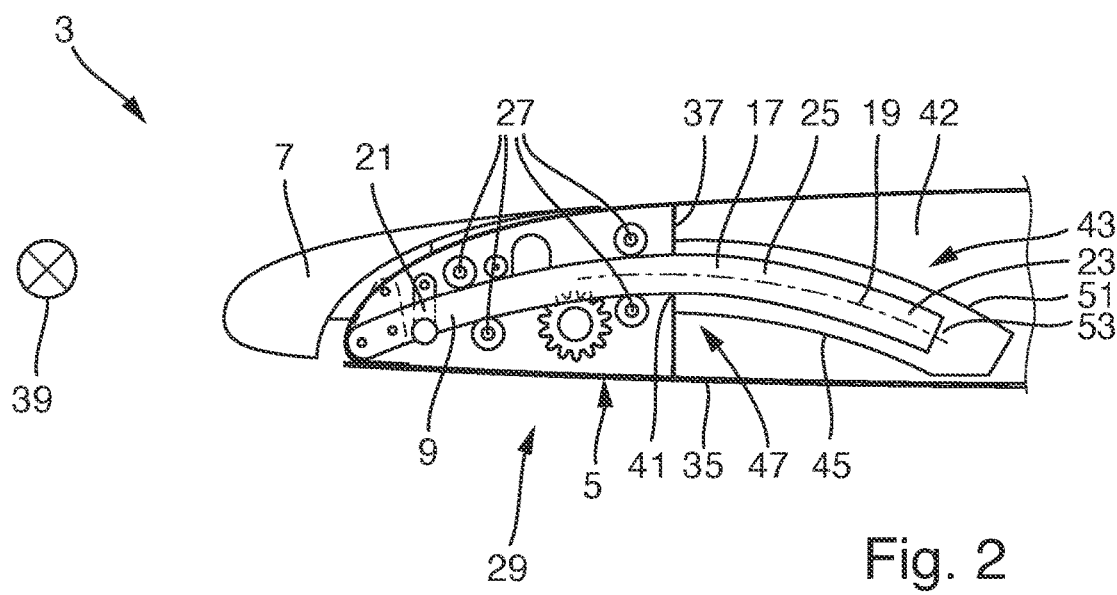
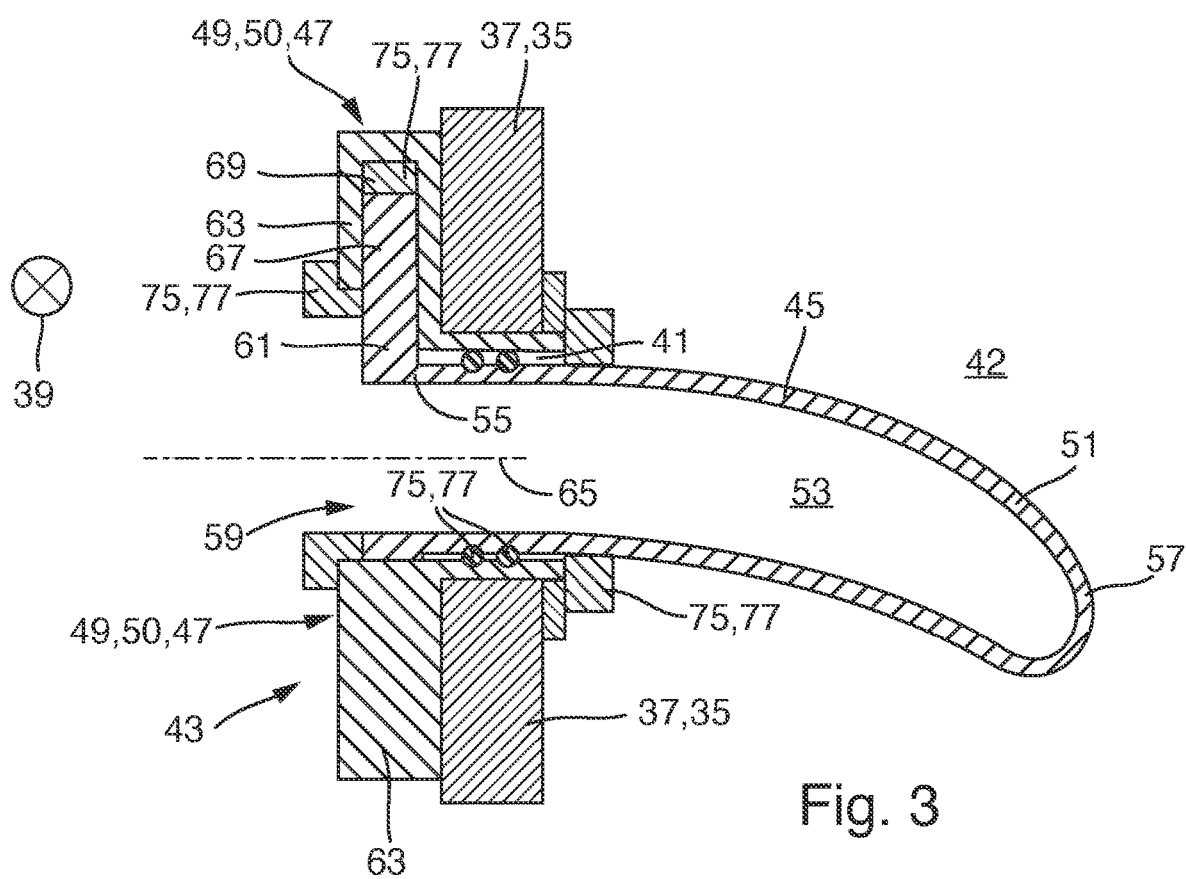
Fig. 2
Fig. 3

WING FOR AN AIRCRAFT

RELATED APPLICATION

This application incorporates by reference and claims priority to European application EP 23151780.6, filed Jan. 16, 2023.

TECHNICAL FIELD

The present invention relates to a wing for an aircraft. Further aspects of the invention relate to a track housing assembly for such a wing, as well as to an aircraft comprising such a wing and/or such a track housing assembly.

BACKGROUND AND SUMMARY

The wing comprises a main wing, a slat, and a connection assembly movably connecting the slat to the main wing, such that the slat is movable between a retracted position and at least one extended position.

The connection assembly comprises an elongate slat track that extends along a curved or straight track longitudinal axis between a front end and a rear end and has an intermediate portion between the front and rear ends. The front end of the slat track is mounted to the slat, such as in a fixed and/or direct manner, e.g. by two spherical bearings, both arranged with an offset in a wing profile plane across a wing span direction. The rear end and/or the intermediate portion of the slat track are mounted to the main wing by a guide bearing, such as a roller bearing or a slide bearing, such that the slat track is movable along the track longitudinal axis along a predefined path between a stowed position, such as when the slat is in the retracted position, and at least one deployed position, such as when the slat is in the at least one extended position.

The main wing comprises a wing box including a front spar that may extend in a span direction and from an upper skin to a lower skin of the main wing. The front spar includes an aperture for the slat track to reach through into an interior of the wing box, which may be used as fuel tank, when the slat track is in the stowed position.

The main wing further comprises a track housing assembly including a track housing, also known as "track can", and a mounting device. The track housing is mounted to the front spar at the aperture, such as around the aperture, by the mounting device and extending from the front spar to the interior of the wing box, so that the track housing may receive at least a part of the slat track when the slat track is in the stowed position and/or in a partly deployed position and reaches through the aperture. The track housing may separate the interior of the wing box vis-à-vis the slat track in a sealing manner, such that no fuel may leak out of the interior of the wing box.

Such wings are known in the art. In the known wings, the mounting device comprises a mounting flange at the track housing extending circumferentially around the opening of the track housing. The mounting flange is usually screwed or riveted to the inner surface of the front spar around the aperture from the interior of the wing box, i.e. from the tank, which is a difficult, laborious and time-consuming procedure both for installation as well as for maintenance.

The present invention may be used to simplify installation and maintenance of the track housing at the front spar. This may be achieved by a mounting device that comprises a quick release mount for mounting the track housing to the front spar. By such a quick release mount, installation and maintenance of the track housing at the front spar can be essentially simplified and accelerated.

According to an embodiment, the quick release mount is formed as a bayonet mount. A bayonet mount relates to a very simple, reliable and quickly locking and unlocking quick release mount.

According to an embodiment, the track housing comprises a housing wall surrounding a housing interior and extending in an elongate and curved or straight manner from a housing front end to a housing rear end. At the housing front end an opening is provided in the housing wall, while the housing rear end may be closed by the housing wall or by a separate part. The track housing is mounted to the front spar in such a way that the opening is aligned with the aperture in the front spar, so that the slat track may reach through the opening into the housing interior when the slat track is in the stowed position. The housing wall may separate and seal the interior of the wing box vis-à-vis the housing interior with the slat track. In such a way, a simple and reliable track housing is formed that can reliably seal the fuel tank in the interior of the wing box from the environment.

According to an embodiment, the mounting device comprises a first mounting part mounted to or formed integrally with the track housing, in particular with the housing wall, such as at the housing front end, and a second mounting part mounted to or formed integrally with the front spar at the aperture, such as in or around the aperture. The first mounting part and the second mounting part are configured to be engaged with one another, and may be releasably engaged with one another. In case the first mounting part and the second mounting part are configured to be releasably engaged with one another, the first mounting part and the second mounting part may be configured to be locked in the engaged state, such as by a locking device including one or more latches or screws. The locking device may be releasable. In such a way, a very efficient quick release mount is formed.

In particular, the first mounting part and the second mounting part may be configured to be engaged with one another, such as releasably engaged with one another, by relative rotation of the first and second mounting parts about an engagement axis, such as defining the opening and/or the aperture and perpendicular to the front spar. In such a way, a very efficient bayonet mount is formed.

One of the first mounting part and the second mounting part comprises at least one locking flange, such as a bayonet flange or two, three or four equally spaced locking flanges. The other one of the first mounting part and the second mounting part comprises at least one locking undercut, such as a bayonet undercut or two, three or four equally spaced locking undercuts. By relative rotation of the first mounting part and the second mounting part about the engagement axis, such as by rotation of the first mounting part relative to the second mounting part, the locking flange(s) are moved into the locking undercut(s) to lock the first mounting part to the second mounting part and inhibit relative movement of the first and second locking parts in parallel to the engagement axis. In such a way, a very efficient bayonet mount is formed.

The second mounting part may be mounted to the front spar in such a way that the at least one locking undercut, and in the mounted state also the at least one locking flange, is arranged at a front side of the front spar, so that the track housing can be mounted from outside the wing box, i.e. inserted from the front through the aperture into the interior of the wing box and then locked by engaging first and second mounting parts. In such a way, installation and maintenance of the track housing can be essentially simplified and accelerated, as it is not necessary to work from the interior of the wing box with its limited space.

Alternatively, the second mounting part is mounted to the front spar in such a way that the at least one locking undercut, and in the mounted state also the at least one locking flange, is arranged at a rear side of the front spar, so that the track housing can be mounted from the interior of the wing box, i.e. inserted in the interior of the wing box and then fitted to the aperture and locked by engaging first and second mounting parts at the rear side of the front spar. This relates to an alternative way of mounting the track housing where all parts of the track housing and the mounting device can be in the interior of the wing box and the track housing and mounting device might be entirely supported at the rear side of the front spar.

According to an embodiment, the second mounting part is formed and mounted to the front spar in such a way that a portion of the second mounting part extends through the aperture in the front spar in the form of a sleeve, thereby simplifying insertion and sealing of the track housing within the aperture. In such a way, a very efficient bayonet mount is formed.

According to another embodiment, the mounting device comprises a sealing arrangement including at least one sealing element, such as in the form of at least one sealing bead and/or at least one O-ring, arranged between the first mounting part and the second mounting part and/or between the track housing and the front spar, thereby sealing the interior of the wing box, in particular the fuel tank, vis-à-vis the environment outside the wing box. In such a way, the environment of the slat track can be reliably sealed from the fuel tank and vice-versa.

A further aspect of an embodiment of the invention relates to a track housing assembly for the wing according to any of the embodiments described above. The track housing assembly comprises a track housing and a mounting device. The track housing is configured to be mounted to a front spar of a main wing by the mounting device, so that the track housing may extend from the front spar to an interior of a wing box and may receive at least a part of a slat track when the slat track is in a stowed position. The mounting device comprises a quick release mount for mounting the track housing to the front spar. The features and effects described above with respect to the wing apply vis-à-vis also to the track housing assembly.

A further aspect of an embodiment of the invention relates to an aircraft comprising the wing according to any of the embodiments described above and/or comprising the track housing assembly according to any of the embodiments described above. The features and effects described above with respect to the wing and the track housing assembly apply vis-à-vis also to the aircraft.

SUMMARY OF DRAWINGS

Hereinafter, an embodiment of the present invention is illustrated in:

FIG. 2 is a cross sectional view across the span direction of a wing of the aircraft shown in FIG. 1, FIG. 3 is a schematic cross sectional view along the engagement axis of a track housing assembly as used in the wing shown in FIG. 2.

DETAILED DESCRIPTION

Figure 1:
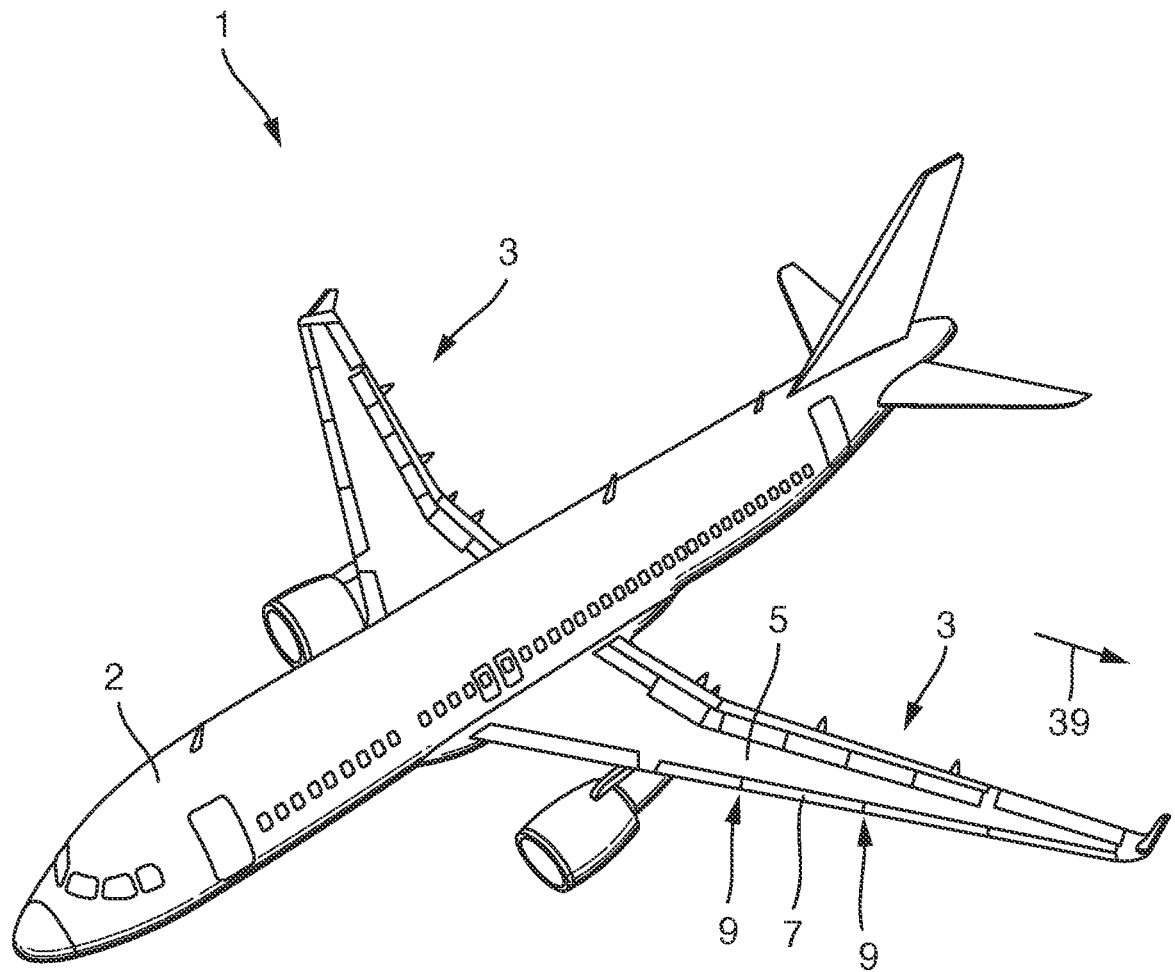
FIG. 1 is a perspective view of an aircraft according to the present invention.

FIG. 1 shows an aircraft 1 having a fuselage 2 and wings 3 that are formed according to an embodiment of the present invention.

FIG. 2 shows a wing 3 according to the invention in more detail. The wing 3 comprises a main wing 5, a slat 7, and a connection assembly 9 movably connecting the slat 7 to the main wing 5, such that the slat 7 is movable between a retracted position and at least one extended position.

The connection assembly 9 comprises an elongate slat track 17 that extends along a track longitudinal axis 19, e.g., an arch shaped axis, between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a guide bearing 27, e.g. a roller bearing or a slide bearing, such that the slat track 17 is movable along the track longitudinal axis 19 within a predefined path between a stowed position 29, when the slat 7 is in the retracted position, as illustrated in FIG. 2, and at least one deployed position (not shown), when the slat 7 is in the at least one extended position.

The main wing 5 comprises a wing box 35 including a front spar 37 extending in a span direction 39 and from an upper skin to a lower skin of the main wing 5. The front spar 37 includes an aperture 41 for the slat track 17 to reach through into an interior 42 of the wing box 35 used as fuel tank, when the slat track 17 is in the stowed position 29.

The main wing 5 further comprises a track housing assembly 43 including a track housing 45, also known as "track can", and a mounting device 47. The track housing 45 is mounted to the front spar 37 around the aperture 41 by the mounting device 47 and extending from the front spar 37 into the interior 42 of the wing box 35 which is aft of the front spar. The track housing 45 receives at least a part of the slat track 17 when the slat track 17 is in the stowed position 29. The slat track 17 extends through the aperture 41 in the front spar. The track housing 45 separates the interior 42 of the wing box 49 from the slat track 17. The slat track 17 is sealed within the track housing. The track housing also prevents fuel leakage from the interior 42 of the wing box 35.

Figure 4:
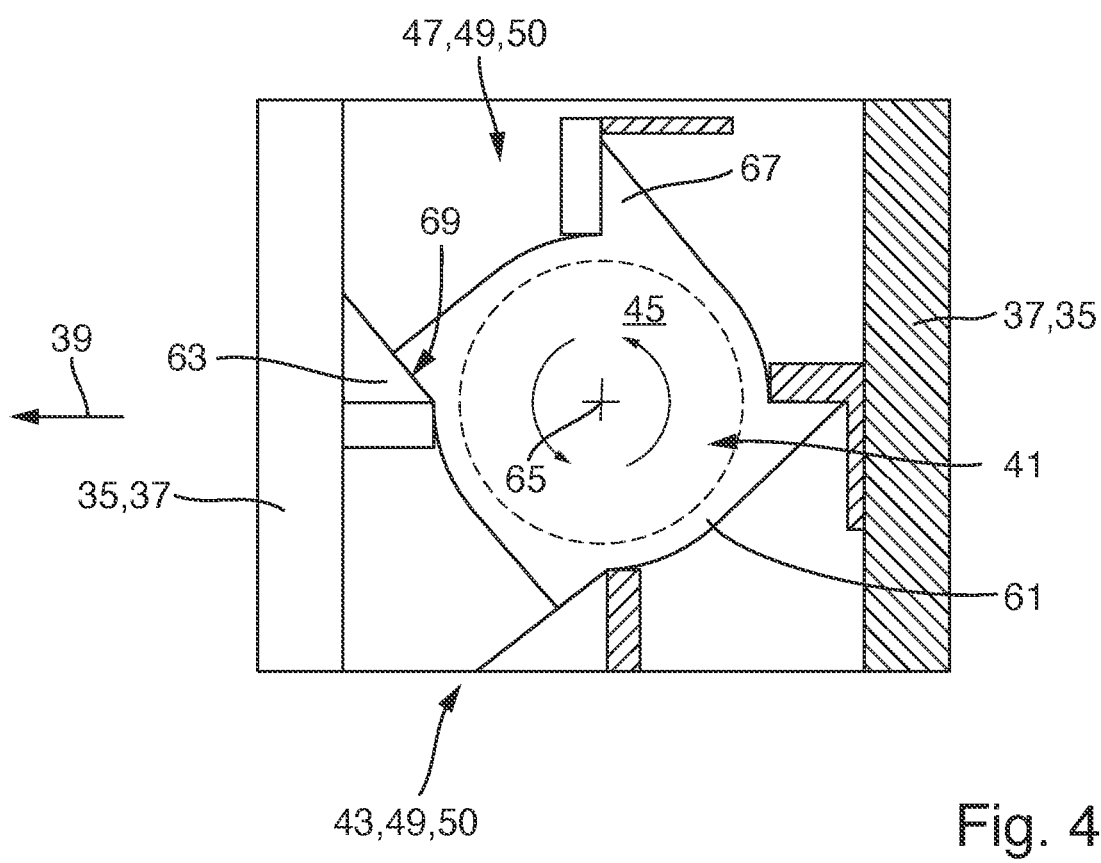
FIG. 4 is a schematic front view (left side) and cross sectional view across the engagement axis (right side) of the track housing assembly shown in FIG. 3.

As shown in FIGS. 3 and 4, the mounting device 47 comprises a quick release mount 49 for mounting the track housing 45 to the front spar 37. The quick release mount 49 in the present embodiment is formed as a bayonet mount 50.

The track housing 45 comprises a housing wall 51 surrounding a housing interior 53 and extending in an elongate and curved manner from a housing front end 55 to a housing rear end 57. At the housing front end 55 an opening 59 is provided in the housing wall 51, while the housing rear end 57 is closed by the housing wall 51. The track housing 45 is mounted to the front spar 37 in such a 67 way that the opening 59 is aligned with the aperture 41 in the front spar 37, so that the slat track 17 may reach through the opening 59 into the housing interior 53 when the slat track 17 is in the stowed position 29. The housing wall 51 separates and seals the interior 42 of the wing box 35 vis-à-vis the housing interior 53 with the slat track 17.

As shown in FIGS. 3 and 4, the mounting device 47 comprises a first mounting part 61 fixedly mounted to or formed integrally with the housing wall 51 of the track housing 45 at the housing front end 55, and a second mounting part 63 mounted to the front spar 37 around the aperture 41. The first mounting part 61 and the second mounting part 63 are configured to be releasably engaged with one another. Specifically, the first mounting part 61 and the second mounting part 63 are configured to be releasably engaged with one another by relative rotation of the first and second mounting parts 61, 63 about an engagement axis 65, wherein the engagement axis 65 defines the opening 59 and the aperture 41 and extends perpendicular to the front spar 37.

As also shown in FIGS. 3 and 4, the first mounting part 61 comprises four equally spaced locking flanges 67. The second mounting part 63 comprises four equally spaced locking undercuts 69. By rotation of the track housing 45 with the first mounting part 61 relative to the second mounting part 63, the locking flanges 67 can be moved into the locking undercuts 69 to lock the first mounting part 61 to the second mounting part 63 and inhibit relative movement of the first and second mounting parts 61, 63 in parallel to the engagement axis 65. The second mounting part 63 is mounted to the front spar 37 in such a way that the at least one locking undercut 69, and in the mounted state also the at least one locking flange 67, is arranged at a front side of the front spar 37, so that the track housing 45 can be mounted from outside the wing box 35 by being inserted from the front through the aperture 41 into the interior 42 of the wing box 35 and then locked by engaging first and second mounting parts 61, 63.

The second mounting part 63 is formed and mounted to the front spar 37 in such a way that a portion of the second mounting part 63 extends through the aperture 41 in the front spar 37 in the form of a sleeve, thereby simplifying insertion and sealing of the track housing 45 within the aperture 41. The mounting device 47 further comprises a sealing arrangement 75 including several sealing elements 77 in the form of sealing beads and O-rings arranged between the first mounting part 61 and the second mounting part 63 and between the track housing 45 and the front spar 37, thereby sealing the interior 42 of the wing box 35 with the fuel tank vis-à-vis the environment outside the wing box 35.

By a quick release mount 49 according to the present invention as described above, installation and maintenance of the track housing 45 at the front spar 37 can be essentially simplified and accelerated.

The invention may be embodied as a wing 3 including a main wing 5, a slat 7, and a connection assembly 9 movably connecting the slat 7 to the main wing 5, wherein the slat 7 moves between a retracted position and an extended position, and the connection assembly 9 includes an elongate slat track 17 that extends along a track longitudinal axis 19 between a front end 21 and a rear end 23 and has an intermediate portion 25 between the front and rear ends 21, 23, wherein the front end 21 of the slat track 17 is mounted to the slat 7, wherein the rear end 23 and/or the intermediate portion 25 of the slat track 17 are mounted to the main wing 5 by a guide bearing 27, such that the slat track 17 is movable along the track longitudinal axis 19 between a stowed position 29 and a deployed position, wherein the main wing 5 comprises a wing box 35 including a front spar 37, wherein the front spar 37 includes an aperture 41 for the slat track 17 to reach through when the slat track 17 is in the stowed position 29, wherein the main wing 5 comprises a track housing assembly 43 including a track housing 45 and a mounting device 47, wherein the track housing 45 is mounted to the front spar 37 at the aperture 41 by the mounting device 47 and extending from the front spar 37 to the interior 42 of the wing box 35, so that the track housing 45 may receive at least a part of the slat track 17 when the slat track 17 is in the stowed position 29.

The invention may be applied to simplify installation and maintenance of a track housing at the front spar by a mounting device 47 that includes a quick release mount 49 for mounting the track housing 45 to the front spar 37.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms "including" and "having" are used as neutral linguistic concepts for the corresponding terms "comprising". Furthermore, use of the terms "a", "an" and "one" shall not in principle exclude the plurality of features and components described in this way.

The invention claimed is:

1. A wing for an aircraft comprising:
a main wing including a front spar and a wing box,
a slat, and
a connection assembly movably connecting the slat to the main wing, wherein the slat is movable between a retracted position and at least one extended position,
wherein the connection assembly comprises an elongate slat track extending along a track longitudinal axis between a front end and a rear end and includes an intermediate portion between the front end and the rear end,
wherein the slat is mounted to the front end of the slat track,
wherein the rear end or the intermediate portion of the slat track is mounted to the main wing by a guide bearing such that the slat track is movable along the track longitudinal axis between a stowed position and a deployed position,
wherein the front spar includes an aperture through which extends the slat track when the slat track is in the stowed position,
wherein the main wing comprises a track housing assembly including a track housing and a mounting device, wherein the track housing is mounted to the front spar at the aperture by the mounting device and extending from the front spar to the interior of the wing box, so that the track housing receives at least a part of the slat track when the slat track is in the stowed position, and
the mounting device comprises a quick release mount which mounts the track housing to the front spar, wherein the quick release mount includes a bayonet mount.

2. The wing according to claim 1, wherein the track housing comprises a housing wall surrounding a housing interior and extending from a housing front end to a housing rear end,
wherein at the housing front end includes an opening into the housing wall,
wherein the track housing is mounted to the front spar such that the opening is aligned with the aperture in the front spar, and
wherein the slat track extends through the opening into the housing interior when the slat track is in the stowed position.

3. The wing according to claim 1, wherein the mounting device comprises a first mounting part mounted to or formed integrally with the track housing and a second mounting part mounted to or formed integrally with the front spar at the aperture, and wherein the first mounting part is engaged with the second mounting part.

4. The wing according to claim 3, wherein the first mounting part is configured to engage the second mounting part by relative rotation of the first mounting part and the second mounting part about an engagement axis.

5. The wing according to claim 3, wherein one of the first mounting part and the second mounting part comprises at least one locking flange, wherein the other one of the first mounting part and the second mounting part comprises at least one locking undercut, and wherein by relative rotation of the first mounting part and the second mounting part about an engagement axis the locking flange moves into the locking undercut to lock the first mounting part to the second mounting part.

6. The wing according to claim 5, wherein the second mounting part is mounted to the front spar such that the at least one locking undercut is arranged at a front side of the front spar.

7. The wing according to claim 5, wherein the second mounting part is mounted to the front spar such that the at least one locking undercut is arranged at a rear side of the front spar.

8. The wing according to claim 3, wherein the second mounting part is formed and mounted to the front spar such that a portion of the second mounting part extends through the aperture in the front spar as a sleeve.

9. The wing according to claim 3, wherein the mounting device comprises a sealing arrangement including at least one sealing element arranged between the first mounting part and the second mounting part and/or between the track housing and the front spar, wherein the at least one sealing element seals the interior of the wing box with respect to an environment outside the wing box.

10. An aircraft comprising the wing according to claim 1.

11. A track housing assembly for a main wing comprising a track housing, and a mounting device including a quick release mount configured to mount the track housing to a front spar of a wing box of the main wing, wherein the mounting device includes a quick release bayonet mount, wherein the track housing is configured to be mounted to the front spar by the mounting device, wherein the track housing extends from the front spar into to an interior of the wing box between an upper skin and a lower skin of the wing box, wherein the track housing is configured to receive at least and enclose a part of a slat track within the interior when the slat track is in a stowed position relative to the main wing, and wherein a front end of the slat track supports a deployable slat forward of the main wing.

12. A wing for an aircraft comprising:

a main wing including a wing box having an upper skin, a lower skin and a front spar with an aperture;

an elongate slat track extending through the aperture in the front spar, and the elongate slat track has a front end, a rear end and an intermediate portion between the front end and the rear end, a slat forward of the main wing and mounted to the front end of the elongate slat track such that the slat moves between a retracted position and at least one extended position;

a guide bearing mounted to the main wing forward of the front spar and supporting the elongate slat track in the main wing such that the elongate slat track is movable between a stowed position and at least one deployed position;

a track housing extending into an interior of the wing box aft of the front spar, wherein the track housing has a front opening aligned with the aperture in the front spar and the track housing receives and encloses at least a portion of the slat track, and a quick release mount attached to the front spar and mounts the track housing to the front spar at the front opening of the track housing, wherein the quick release mount includes a bayonet mount.

13. The wing according to claim 12, wherein the track housing is a sleeve including a housing wall and extending from a housing front end to a housing rear end, wherein at the housing front end includes an opening into the housing wall, wherein the track housing is mounted to the front spar such that the front opening is aligned with the aperture in the front spar, and wherein the slat track extends through the opening into a housing interior defined by the housing wall.

14. The wing according to claim 12, wherein the quick release mount includes a first mounting part mounted to or formed integrally with the track housing and a second mounting part mounted to or formed integrally with the front spar at the aperture, and wherein the first mounting part is releasably engaged with the second mounting part to mount the track housing to the front spar.

15. The wing according to claim 14, wherein the first mounting part is configured to engage the second mounting part by relative rotation of the first mounting part and the second mounting part.

16. The wing according to claim 14, wherein one of the first mounting part and the second mounting part comprises at least one locking flange, wherein the other one of the first mounting part and the second mounting part comprises at least one locking undercut, and wherein by relative rotation of the first mounting part and the second mounting part the locking flange moves into the locking undercut to lock the first mounting part to the second mounting part.

17. The wing according to claim 16, wherein the second mounting part is mounted to the front spar such that the at least one locking undercut is arranged at a front side of the front spar.

18. The wing according to claim 14, wherein the second mounting part is formed and mounted to the front spar such that a portion of the second mounting part extends through the aperture in the front spar as a sleeve.

* * * * *